Feb. 8, 1938.   A. M. HAHN   2,107,822
ROLLER CONVEYER
Filed Feb. 16, 1937   3 Sheets-Sheet 1

Inventor
Arthur M. Hahn
By Paul, Paul & Moore
Attorneys

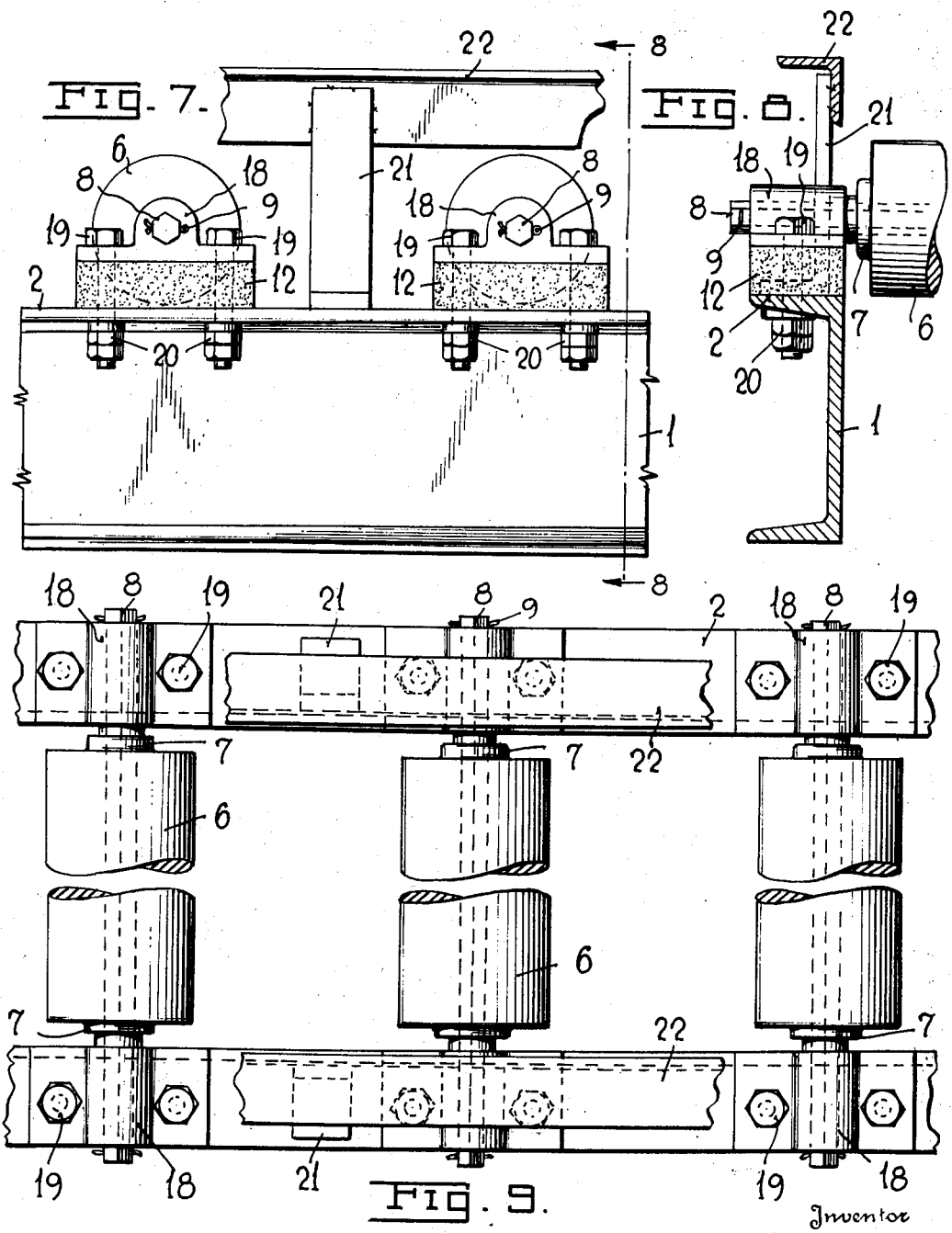

Feb. 8, 1938.  A. M. HAHN  2,107,822
ROLLER CONVEYER
Filed Feb. 16, 1937  3 Sheets-Sheet 3

Patented Feb. 8, 1938

2,107,822

UNITED STATES PATENT OFFICE 2,107,822

ROLLER CONVEYER

Arthur M. Hahn, Washington, D. C., assignor to Mathews Conveyer Company, Ellwood City, Pa., a corporation of Pennsylvania Application February 16, 1937, Serial No. 125,976

15 Claims. (Cl. 193—35)

This invention relates to conveyers and is directed more particularly to resiliently mounted conveyers of the general type such as those disclosed in the co-pending applications of Hubert M. Rishel Serial Nos. 70,202, 70,203 and 70,204 each filed March 23, 1936, now Patents No. 2,077,188, No. 2,077,189, and No. 2,077,190, respectively.

Roller conveyers for transporting articles by gravity and commonly known as "gravity conveyers", or by some force applied to the load and commonly referred to as "push line conveyers", consist generally of a pair of laterally spaced side members having a plurality of rotatable rollers mounted therebetween. The usual practice is to form each roller from a suitable length of steel tubing, into each end of which is pressed an anti-friction bearing element that is usually in the form of a ball bearing unit having inner and outer races. A non-rotatable axle extends through each roller, its bearings and the side frame members so that the roller is freely rotatable on its anti-friction bearings, the inner races whereof are non-rotatably mounted on the axle.

In assembling a conveyer of this or similar construction, in production methods, it is practically impossible to accurately aline the tops of the rollers in a conveyer line within extremely close limits, and in fact, it is useless to do so, as the steel tubing of the rollers is not a true cylinder and is often slightly "out of round" irrespective of the method of its manufacture. Furthermore, the anti-friction bearings of each roller are usually pressed into the ends of the steel tube forming the roller, and the ends of the tube are then swaged into tight frictional contact with the outer races of the bearings to lock the bearings to the tube. Here again, slight inaccuracies in alining the bearings with the longitudinal axis of the tube are bound to occur.

It is evident from the above, that while to all outward appearances, a conveyer will have the tops of its rollers lying in a common plane, nevertheless, if a straight edge is placed longitudinally along the conveyer and over the tops of the rollers, it will be seen that some rollers are slightly higher than others, or if some of the rollers are rotated, slight eccentricities of rotation will be apparent. It is, of course, understood that these inaccuracies are of a relatively small value and may vary from a few hundredths of an inch to as much as $\frac{1}{16}$ of an inch or possibly more if one roller is rotated to its "highest" position and another to its "lowest" position.

Conveyers are usually designed for the particular use for which they are intended. In steel mill work, for example, where heavy loads of the order of 20,000 lbs. or more are to be transported, the conveyer engineer will first ascertain the maximum weight of the loads to be transported and the area of the load that will be in contact with the rollers, so that he can ascertain the load which will be imposed on each roller. The conveyer is then designed with rollers of a suitable size and spacing with respect to each other so that the bearings of the rollers will not be damaged as the load moves thereover.

In actual practice, however, it is obvious due to the aforementioned inaccuracies in alinement of the roller tops, that those rollers which are "high" will have to support considerably more than their share of the load and hence this causes undue strains and wear on the bearings of these rollers which shortens their life considerably even when a safety factor of considerable size is allowed in designing the conveyer.

The same problem is present in smaller conveyers for transporting relatively light loads such as packages, cases, etc., as the conveyers are of correspondingly lighter construction and usually are subjected to much more constant use. Also in these relatively light load conveyers, the inaccuracies in roller alinement not only cause undue wear on the roller bearings, but the articles being transported thereover, are subjected to vibration caused by the unevenness of the path of travel and of course noise is created which may or may not be objectionable depending upon the surroundings where the conveyer is being used.

It is the primary object of the present invention to provide a self-alining conveyer in the form of resilient mountings for the conveyer rollers which shall permit each "high" roller to be depressed to the plane of alinement of the other rollers which are in contact with, and which are supporting the load being transported. In this manner, the weight of the load is distributed over all of the rollers in engagement with the load, and overloads on the bearings of the "high" rollers are eliminated thus greatly prolonging the life of the bearings.

Another object is to provide a self-alining conveyer wherein the rollers are resiliently supported, so that objects having irregular surfaces which are being transported over the conveyer in direct contact with the rollers, or having portions projecting below the skids supporting such object, will permit the rollers to be depressed in accordance with such irregular contour of the hollow surface of the object and thereby distribute the load over a plurality of rollers. In this manner, overloading of the bearings of any particular roller or group of rollers is avoided as well as providing a smoother path of travel for the object over the conveyer.

Another object is to provide a resilient mounting in the form of resilient rubber elements between the conveyer side frames and the axles of the conveyer rollers whereby the rollers may move in a substantially vertical plane with respect to the conveyer frame so that inaccuracies in alinement of the tops of the rollers may be automatically compensated for as the load passes over the rollers, by reason of the rubber elements being compressed.

A further object is to provide a conveyer which shall be relatively quiet in operation by reason of the aforementioned rubber elements absorbing the vibrations set up by the rotating rollers and preventing such vibrations being transmitted to the side frames.

A further object is to provide a self-alining conveyer which shall materially reduce the force required to move a load over the rollers by virtue of the elimination of "high" spots in the conveyer line, and thus providing a smooth and unbroken path of travel for the objects being transported.

A still further object is to provide a conveyer of the aforesaid character which shall be simple in construction, inexpensive to manufacture, easy to service, and which shall be effective for transporting relatively light, medium or relatively heavy loads.

In the drawings accompanying and forming a part of this application, I have shown certain illustrative embodiments of my invention, and wherein Figure 1 is a fragmentary side elevation of a conveyer constructed in accordance with my invention and illustrating each resiliently mounted unit as having two rollers;

Figure 7 is a fragmentary side elevation of a modified form of conveyer embodying my invention and illustrating individually mounted resilient rollers;

Figure 8 is a fragmentary vertical sectional view taken on the line 8—8 of Figure 7;

Figure 9 is a fragmentary top plan view thereof;

Figure 1:
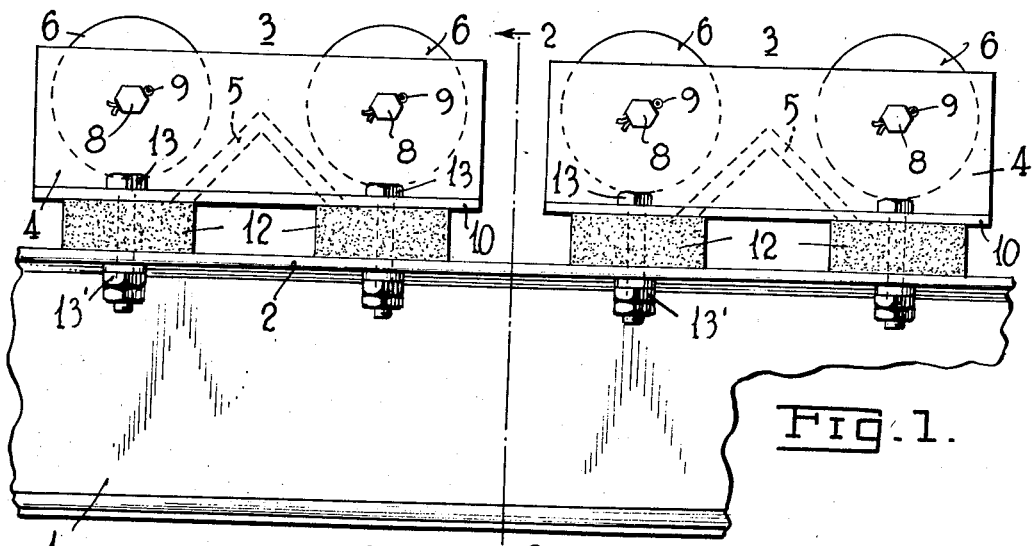
Figure 2:
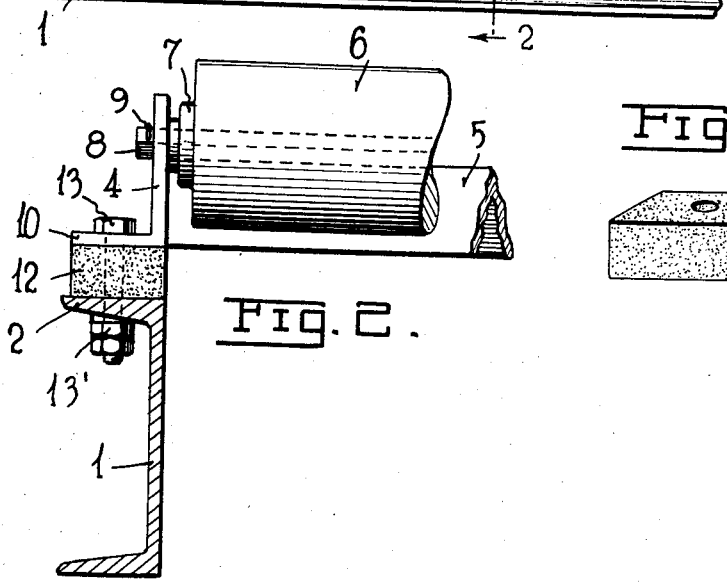
Figure 2 is a fragmentary vertical sectional view taken on the line 2—2 of Figure 1.

Referring to Figures 1 and 2, I have illustrated my invention applied to a conveyer comprising a support and a plurality of units mounted thereon, each having a plurality of rollers. In these figures, 1 denotes the main supporting frames of the conveyer, each of which is preferably in the form of a channel member that is arranged with the open side of the channel facing outwardly so as to avoid pockets for dust and dirt which tends to collect between the side frames. Supported on the upper horizontal flanges 2 of the main frames are a plurality of roller units indicated generally at 3. Each of these units is identical in construction and consists preferably of a pair of laterally spaced angle side frames 4 which are interconnected by a cross member 5 that is preferably welded thereto to provide a rigid construction. A pair of rollers 6, 6 are rotatably supported between the side frames 4, and in the present instance, I have illustrated each roller as being formed from a suitable length of steel tubing and having ball bearing units 7 pressed into the ends thereof. The axial aperture of the inner race of each bearing is preferably prismatic in cross-section and a similarly shaped axle 8 extends longitudinally through the roller, inner races and through correspondingly shaped apertures in the vertical flange of the angular side frames 4. A cotter pin 9 adjacent each end of the axle prevents longitudinal displacement thereof.

The roller units thus far described are of standard construction and it is obvious that any other suitable unit construction might be used equally well.

Interposed between the base flange 10 of the side frames 4 and the top flange 2 of the main supporting channels are a plurality of resilient rubber elements in the form of pads or blocks 12. Each rubber pad is held in position in any suitable manner, and in the present instance, I have illustrated bolts 13 extending through flanges 10, rubber pads 12 and the top flanges 2. Nuts 13' are applied to the end of each bolt to hold the parts in tight relationship.

The resilient rubber pads 12 may be of any suitable rubber composition to impart the desired resilience, such resilience depending upon the weight of the load to be transported over the conveyer and the share of the load to be carried by each roller unit.

Figure 3:
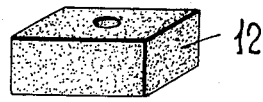
Figure 3 is a perspective view of one of the resilient rubber elements.
Figure 4:
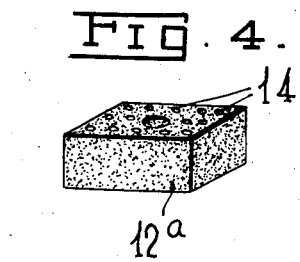
Figure 4 is a similar view of a modified form of rubber element of a more resilient character.
Figure 5:
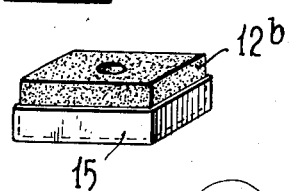
Figures 5 and 6 are similar views of further modified forms of rubber elements of a less resilient character.
Figure 6:

The resilience of the rubber pads may also be controlled mechanically, as for example, as illustrated in Figures 4, 5 and 6. In Figure 4, I have shown a rubber pad 12ª having a plurality of bores 14 extending therethrough to provide a more resilient pad. The bores 14 permit the rubber of the pad to be displaced more easily than in the case of a solid pad such as illustrated in Figure 3 when a load is imposed thereon.

In Figure 5, I have illustrated a less resilient pad 12ᵇ. In this form, the pad is partly confined by a metallic housing 15 which surrounds a portion of each of the four sides of the pad and may or may not confine the lower face of the pad. It is obvious that displacement of the rubber pad may take place only in that portion which is not confined by the housing 15 and hence this form of pad will be less resilient.

In Figure 6, I have illustrated a laminated form of pad which is composed of a plurality of resilient rubber pads 16 that are separated from each other by thin metal plates 17. This form of pad is also less resilient than the pad shown in Figures 3 and 4.

A still further means of controlling the resilience of the rubber pads is to place the pads under pre-compression by tightening down on the bolts 13 and nuts 13' which obviously renders the rubber pads less resilient.

The foregoing are illustrative of a few of the methods which may be employed to vary the resilience of the rubber pads to secure the desired action in the conveyer, and it is obvious that other methods or combinations of the above could be used. The action desired, of course, is to provide sufficient resilience in the roller mountings to permit "high" rollers to be depressed to the common plane of the tops of adjacent rollers as the load passes thereover. The entire particular group of rollers engaged by the load at any point on the conveyer should not be depressed to any appreciable extent as otherwise the load would ride on a plane below the normal plane of the tops of the rollers and thus additional force would be required to move the load.

In Figures 7, 8 and 9, I have illustrated my invention applied to a conveyer in which each roller is a single unit. This form of conveyer permits the rollers to be spaced at any desired distance longitudinally of the conveyer line.

In these figures, the main support for the roller units may be of any suitable type, such as the channel members 1 previously described. The rollers, bearings and axles may also be similar to those previously described. I have shown each roller individually and resiliently mounted by providing rubber pads 12 on the top flanges 2 of the main frames 1, and seated on top of each rubber pad is an axle supporting member 18 through which the end of the axle extends. Bolts 19 and nuts 20 secure the parts together. It is obvious that the resilience of the mountings in this form of conveyer may also be varied as previously described. I have also shown a suitable guard rail fitted to the conveyer and consisting of uprights 21 that are mounted on the top of flanges 2 of the main side frame, and a longitudinally disposed angle member 22 which maintains the articles on the conveyer rollers as they are transported thereover.

Figure 10:
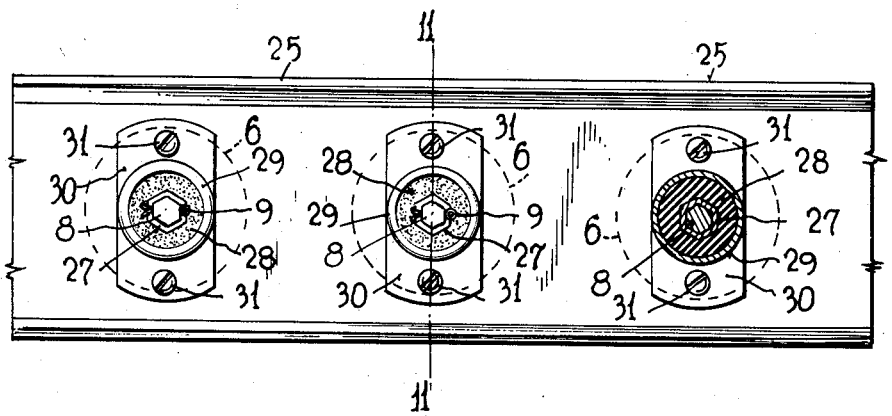
Figure 10 is a fragmentary side elevation of a still further modification of a resiliently mounted roller conveyer which is particularly adapted for relatively light loads.
Figure 11:
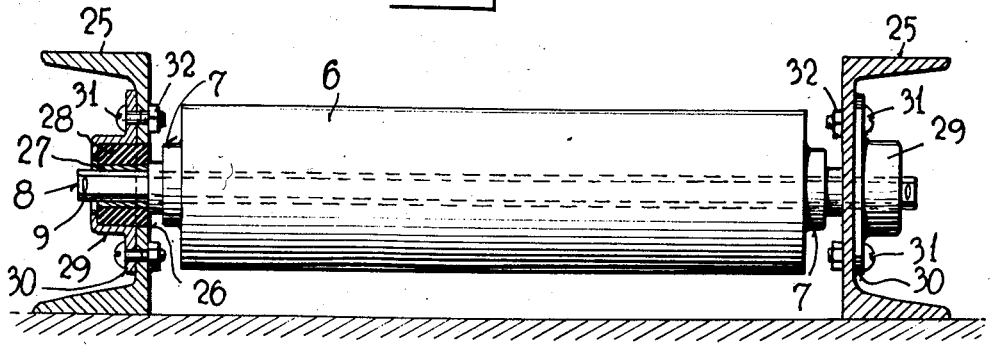
Figure 11 is a vertical sectional view taken on the line 11—11 of Figure 10.

In Figures 10 and 11, I have illustrated a resilient rubber mounting for conveyers that are intended for medium to relatively light weight loads. In this form, the side supporting rails 25 may be of channel shape or any other suitable form. The rollers 6, bearings 7 and axles 8 are of standard construction as previously described.

Each side frame 25 is formed with a plurality of apertures 26 in alinement with the axes of the rollers to be mounted therebetween and the resilient support for each roller axle is preferably assembled as a unit and bolted or otherwise secured to the frame 25. This resilient support comprises a metal sleeve 27 of prismatic cross-section that is adapted to engage the end portion of the similarly shaped axle 8, a resilient rubber sleeve 28, and a metal outer housing 29 closely embracing the rubber sleeve. The housing 29 is formed with flanges 30 which facilitate securing the unit in position on the side frames 25 by bolts 31 and nuts 32. In order to expedite assembly of the conveyer, I preferably vulcanize or cement the resilient rubber sleeve 28 to the metal housing 29 and to the inner metal sleeve 27 so as to form a unit structure, although these parts may be assembled individually if found desirable.

The resilience of the rubber sleeve 28 may be varied by providing the same with apertures similar to those in Figure 4; by varying the size of the metal housing 29 with respect to the rubber sleeve 28 similar in principle to that shown in Figure 5; by forming the sleeve as a laminated structure of rubber and metal sleeves similar in principle to that shown in Figure 6; by pre-compressing the rubber sleeve 28 before it is inserted between the inner metal sleeve 27 and outer metal housing 29; or by varying the composition of the rubber compound from which the sleeve is made.

From the foregoing description, it will be apparent that conveyers having my improved resilient rubber mountings for the rollers provide a roller bed which is automatically self-alining as the load moves thereover. Hence all "high" spots are eliminated from the roller bed and the slight inaccuracies inherent in production methods of making and assembling conveyers is compensated for without materially increasing the cost of manufacture of the entire conveyer.

What I claim is:

1. A self alining conveyer comprising a support, a plurality of conveyer rollers carried by said support, and resilient rubber elements interposed between said support and said rollers.

2. A self alining conveyer comprising a support, a plurality of conveyer rollers carried by said support, said rollers each having an axle carried by said support, and resilient rubber elements interposed between said support and said axles to permit relative movement between said rollers and said support.

3. A self alining conveyer comprising a support, a plurality of roller units carried by said support, said units each consisting of a tubular body portion and an axle extending longitudinally through said body portion, said axle being carried by said supports, and a resilient rubber element interposed between said support and each end of each axle.

4. A self alining conveyer comprising a support, a plurality of roller units carried by said support, said units each consisting of a tubular body portion and an axle extending longitudinally through and beyond said body portion, axle supporting members engaging the end portions of the axle of each roller unit, and resilient rubber elements interposed between said support and said axle supporting members.

5. A self alining conveyer comprising a support, a plurality of roller units carried by said support, said units each consisting of a plurality of rollers and each roller having an axle extending longitudinally through and beyond its body portion, an axle supporting member engaging the end portions of the axles of each unit at each side of the conveyer, and resilient rubber pads interposed between said axle supporting members and said support thereby to provide a resilient mounting for said rollers in a plane at substantially right angles to the plane of the tops of the rollers.

6. A self alining conveyer comprising a support, a plurality of conveyer rollers carried by said support, resilient rubber elements interposed between said support and said rollers, and means for pre-compressing said rubber elements independent of the weight of the rollers or load adapted to be supported by said rollers.

7. A self alining conveyer comprising a pair of side frame members disposed in laterally spaced relation, a plurality of rollers mounted between said side frame members and having axles carried by said frame members, and a resilient rubber sleeve surrounding each end portion of each axle and interposed between said axle and said main side frames.

8. A self alining conveyer comprising a pair of side frame members disposed in laterally spaced relation, a plurality of rollers mounted between said side frame members and having axles carried by said frame members, and a resilient mounting interposed between each end of each axle and said side frame members, said resilient mounting comprising a housing adapted to be secured to a frame member, a resilient rubber element carried by said housing, and a metal sleeve carried by said rubber element, said sleeve having an aperture adapted to receive an axle end portion.

9. A resilient mounting for conveyer rollers comprising a resilient rubber element adapted to yieldingly support the end portion of a conveyer roller axle, a rigid member engaging said rubber element, and means for connecting said rigid member to the conveyer roller support.

10. A resilient mounting for conveyer rollers comprising a hollow resilient rubber element adapted to receive and yieldingly support the end portion of a conveyer roller axle, a housing engaging the outer surface of said rubber element, and means for connecting said housing to the conveyer roller support.

11. A resiliently mounted conveyer comprising a pair of laterally spaced side rails, a plurality of rollers having axles extending between said side rails, a resilient rubber pad interposed between the end portion of each axle and its respective side rail, and means for maintaining said axle and rubber pad in substantially fixed relation with respect to lateral and longitudinal displacement on said side rail but permitting vertical movement of said axle with respect to said rails.

12. A resiliently mounted conveyer comprising a pair of laterally spaced side rails, a plurality of rollers having axles, extending between said side rails, axle supporting members receiving the ends of each axle, a resilient rubber pad interposed between the end portion of each axle supporting member and its respective side rail, and means for maintaining said axle supporting member and rubber pad in substantially fixed relation with respect to lateral and longitudinal displacement on said side rail but permitting vertical movement of said axle with respect to said rails.

13. A resiliently mounted conveyer comprising a pair of laterally spaced side rails, a plurality of rollers having axles extending between said side rails, a resilient rubber pad interposed between the end portion of each axle and its respective side rail, and means for maintaining said rubber elements under a force of precompression independent of the weight of the rollers or load adapted to be supported by said rollers.

14. A resiliently mounted conveyer comprising a pair of laterally spaced side rails, a plurality of rollers having axles, extending between said side rails, axle supporting members receiving the ends of each axle, a resilient rubber pad interposed between the end portion of each axle supporting member and its respective side rail, and means for precompressing said rubber elements independent of the weight of the rollers or load adapted to be supported by said rollers.

15. A self alining conveyer comprising a support, a plurality of conveyer rollers carried by said support, and resilient rubber elements interposed between said support and said rollers, said rubber elements being under a force of precompression independent of the weight of the rollers or load adapted to be supported by said rollers.

ARTHUR M. HAHN.